March 10, 1970 C. T. MASTERS 3,499,983

VIDEO SCANNING SYSTEM WITH HIGH INTERLACE RATIO

Filed Sept. 28, 1966

INVENTOR.
CHARLES T. MASTERS

BY Arthur Decker
ATTORNEY 3,499,983
Patented Mar. 10, 1970

3,499,983

VIDEO SCANNING SYSTEM WITH HIGH INTERLACE RATIO

Charles T. Masters, San Jose, Calif., assignor to International Business Machines Corporation, Armonk, N.Y., a corporation of New York Filed Sept. 28, 1966, Ser. No. 582,748
Int. Cl. H04n 3/30
U.S. Cl. 178—7.5 8 Claims

ABSTRACT OF THE DISCLOSURE

A cathode ray display system having a set of deflecting coils which tend to deflect the electron beam in a conventional manner. In addition two beam deflecting plates are employed which deflect the beam between two adjacent scan lines. A square wave is applied to the deflecting plates so that as the beam scans horizontally it alternately scans a first line and then a second line a plurality of times during a single sweep of a horizontal scan. This effects scanning of two lines during one horizontal scan period.

Figure 1:
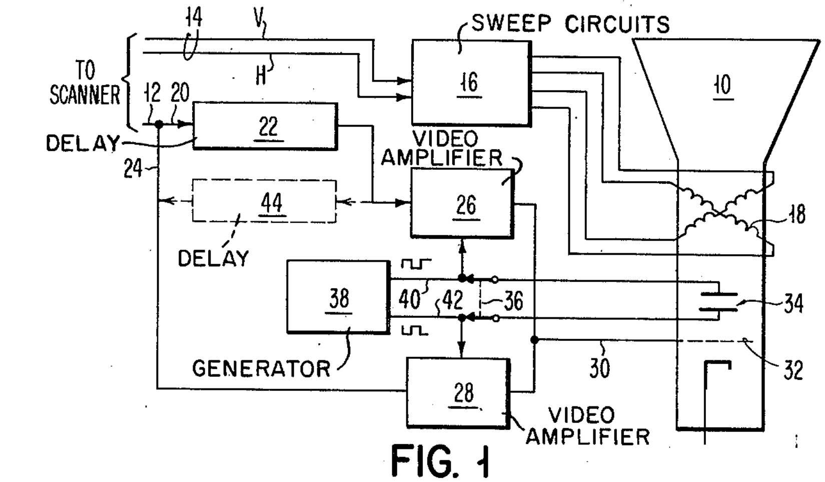

This invention relates to video scanning and display systems and, more particularly, to an interlaced scanning system in which the interlace ratio is increased beyond that generally employed in television or facsimile.

In conventional television, an area is substantially uniformly scanned, usually by an electron beam, in a predetermined pattern of scanning lines called a raster. In one system, 525 horizontal lines constitute the raster and 15,750 video line signal trains are generated per second, 30 frames are scanned each second. In order to eliminate flicker, the raster is scanned from top to bottom of the area at an effective rate of 60 scans per second; alternate horizontal lines comprise each such scan, thereby increasing the downward rate. It is customary to designate each set of line signals resulting from an area as a field. The field rate is thus 60 per second whereas the frame rate remains 30 per second, thereby preserving communications bandwidth. Such a system is said to be characterized by a 2:1 interlace ratio.

It would be desirable, in order to narrow bandwidth still further, to provide an additional reduction in frame rate without sacrificing advantages, such as high resolution, based on high field rate, and without introducing other problems, such as timing, synchronizing, or blanking complications or image crawl; in other words, to further increase the interlace ratio. This, then, is a primary object of the present invention.

Specifically, it is an object of this invention to show how, in video communications, scanning interlace ratio may be increased to as much as 4:1 without loss of information content or other deleterious effect.

Briefly, in accordance with the present invention as applied, for instance, to the cathode ray tube display of video information, the frame period (time in which are generated the signals corresponding to a scanned frame) is divided into four field periods; during each of the latter, a pulse train corresponding to the scan of every fourth line of the area is generated. Thus, during the first field period of a frame period, lines 1, 5, 9, etc. of the frame are sequentially scanned, during the second field period, lines 2, 6, 10, etc. of the frame are sequentially scanned, during the third field period, lines 3, 7, 11 etc. are scanned, and, during the fourth field period, lines 4, 8, 12, etc. are scanned. The field period pulse trains are fed into storage means having a delay between input and output of two field periods. The output of the storage means and the undelayed pulse train are alternately sampled at a high rate by means of an electronic switch and the alternate samples are fed to the display cathode ray tube grid. Thus, the grid would be energized alternately by lines 1 and 3 of fields 1 and 3, respectively, lines 2 and 4 of fields 2 and 4, respectively . . . lines 5 and 7 of fields 1 and 3, respectively, lines 6 and 8 of fields 2 and 4, respectively, etc. In synchronism with the sampling operation previously described, a switching network in the system, operating at the sampling rate, energizes a pair of deflection plates in the cathode ray tube such that small signal portions of lines 1 and 3 are displayed alternately, these being followed by lines 5 and 7, then 9 and 11, etc. In this way, the information contained in fields 1 and 3 is displayed during one field period (1/60 second). Fields 2 and 4 are displayed in the same manner. As a result, the frame rate has been increased from 15 frames per second to 30 frames per second and the above designated advantages are achieved.

The foregoing and other objects, features and advantages of the invention will be apparent from the following more particular description of a preferred embodiment of the invention, as illustrated in the accompanying drawings.

FIGURE 1 is a block diagram of the system of the invention; and

Figure 3:
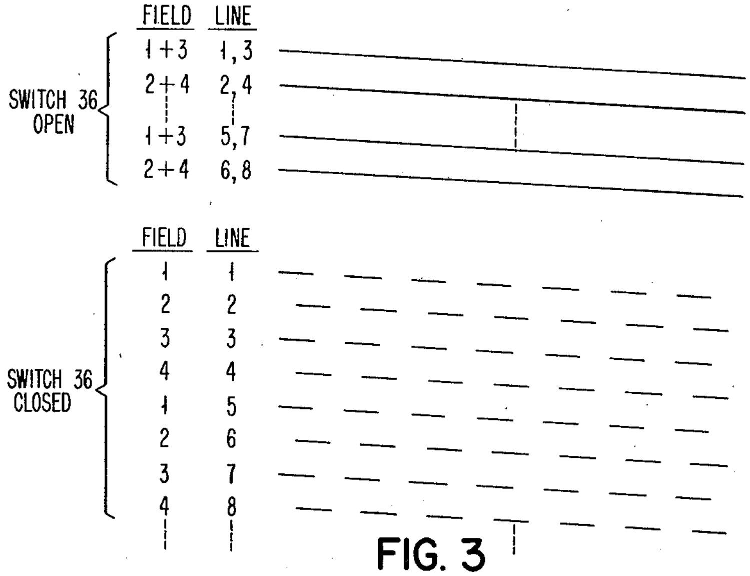
Figure 2:
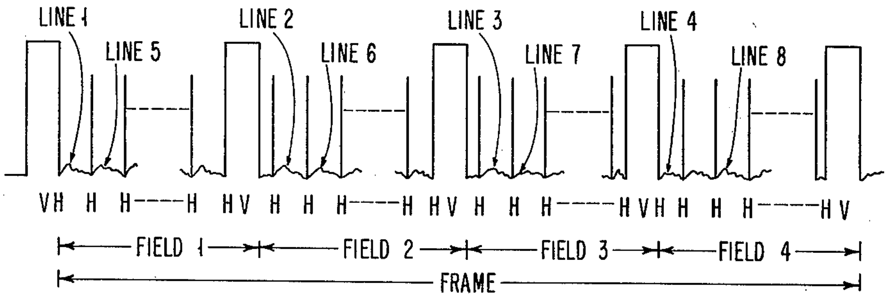

FIGURES 2 and 3 contain sets of line diagrams depicting the operation of the system of FIGURE 1.

Referring now to FIGURE 1, a block diagram of a display system incorporating the present invention, here is shown cathode ray tube 10 on which the image corresponding to video signal trains generated by an area scanner device (not shown) is presented. The scanner may be any of those well known to the art, such as flying spot, aperture, mechanical, photoelectric, etc., and need not be of concern here other than to point out that it provides two inputs to the system: one, on line 12, comprises sequential video signals, the instantaneous value of which corresponds to the brightness of the elements of a scanned line, and the other, on lines 14, comprising the ordinary video (TV) vertical and horizontal synchronizing pulses, the former, signal V, emitted at the end of each field scan, and the latter, signal H, emitted at the end of each lines scan. As is known, signals V and H energize sweep circuits 16 to cause positioning of the electron beam of cathode ray tube 10 by deflection coil 18, and the time interval of signal V comprises the vertical flyback time of the beam from bottom to top of the cathode ray tube 10, whereas the time interval of signal H comprises the flyback time from right to left; of course, the duration of signal V is several orders of magnitude greater than that for signal H.

The video signal, via line 20, provides input to delay unit 22 having a delay of twice the period of signal V, i.e. as long as the time for the scanner to make two field scans. Such units are also well known and are typically constructed of cyclic magnetic drums and disks, magnetostrictive elements, magnetic cores operated in read-write cycles, etc. The output of delay unit 22 is fed to video amplifier 26. In parallel with this circuitry, line 24 supplies the undelayed video signal to video amplifier 28. The outputs of amplifiers 26 and 28 are combined on line 30, which connects to intensity grid 32 of cathode ray tube 10.

Also included in cathode ray tube 10 is a pair of auxiliary deflection plates 34 arranged to provide slight vertical displacement of the electron beam by approximately the distance between horizontal line scans. Plates 34 are connected through switch 36 to receive the complementary outputs, on lines 40 and 42, of square wave generator 38, or no energization in accordance with the position of switch 36. Generator 38 is set for a pulse repetition rate of about twice the bandwidth of the video signal, such that the horizontal line traced by the electron beam will be segmented vertically. Lines 40 and 42 also gate the operation of amplifiers 26 and 28, thereby alternately displacing alternate lines of the display. Of course, when switch 36 is open, alternate scan lines are displayed simultaneously on the same horizontal sweep line of the electron beam.

FIGURE 2 is a line diagram showing a frame of display which, in accordance with the concept of the invention, consists of four fields, thereby providing the interlace ratio of 4:1, previously discussed. As shown, each field comprises the video signal trains for every fourth line scan and synchronization is to signals V and H.

The top portion of FIGURE 3 shows the display produced on cathode ray tube 10 by the present system with switch 36 open. As designated, the content of lines 1 and 3 of the respective fields are comingled, as are other pairs of lines from alternate fields.

The lower portion of FIGURE 3 shows the effect of closing switch 36 to thereby provide vertical separation of paired line portions.

There are many applications in which essentially stationary sources need to be scanned for display. Such applications include reproduction and display of documents, computer generated information, etc. In contemplation of single frame display of relatively motionless objects, included in FIGURE 1 is delay unit 44, which may be of the same type as delay unit 22, connected as a recirculating path around the latter, and introducing a delay of one frame period. It is apparent that this modification provides the desired increased interlace ratio for stationary sources.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. In a display system for an interlaced-scan composite signal containing vertical and horizontal synchronization pulses and a video waveshape corresponding to successive scans of an image, the combination comprising:

a cathode-ray tube having an electron beam and including a deflection coil for deflecting said beam and an intensity grid for varying the intensity of said beam;

sweep circuits responsive to the vertical and horizontal synchronization pulses to provide corresponding deflection power for the deflection coil of said cathode ray tube;

a delay unit responsive to the video waveshape;

a first amplifier responsive to the video waveshape;

a second amplifier responsive to the output of said delay unit;

means to connect the outputs of said amplifiers together and to the intensity grid of said cathode ray tube; and means to gate said amplifiers alternately on an off a plurality of times during a single horizontal scan of said beam and simultaneously effect movement of said beam from one horizontal line scan to another to scan two horizontal lines during a single horizontal scan period.

2. The combination of claim 1 wherein the interlace ratio of the composite signal is at least 4 to 1.

3. The combination of claim 2 wherein said delay unit introduces a delay of twice the period of the vertical synchronizing pulses of the composite signal.

4. The combination of claim 3 wherein said means to gate said amplifiers operates at a repetition rate approximately twice the bandwidth of the composite signal.

5. The combination of claim 1 wherein said cathode ray tube also includes auxiliary deflection means connected to the output of said means to gate said amplifiers.

6. The combination of claim 5 wherein the auxiliary deflection means of said cathode ray tube comprises a pair of deflection plates capable of deflection in the vertical plane a distance corresponding to successive scans of the image represented in the composite signal.

7. The combination of claim 4 and an auxiliary delay unit connected to said delay unit to provide therefore a recirculation path, and having a delay of four times the period of the vertical synchronizing pulses of the composite signal.

8. The combination of claim 5 and an auxiliary delay unit connected to said delay unit to provide therefore a recirculation path, and having a delay of four times the period of the vertical synchronizing pulses of the composite signal.

References Cited

UNITED STATES PATENTS

| | | | |
|---|---|---|---|
| 2,548,219 | 4/1951 | Jenkins | 178—7.7 |
| 2,681,383 | 6/1954 | Loe | 178—7.7 |
| 2,921,211 | 1/1960 | Tulon et al. | 178—7.5 |

ROBERT L. GRIFFIN, Primary Examiner

ALFRED H. EDDLEMAN, Assistant Examiner